(No Model.) 4 Sheets—Sheet 1.

F. H. RICHARDS.
WEIGHING MACHINE.

No. 589,299. Patented Aug. 31, 1897.

Witnesses:
Chas. D. King
Fred. J. Dole.

Inventor:
F. H. Richards.

(No Model.) 4 Sheets—Sheet 2.

F. H. RICHARDS.
WEIGHING MACHINE.

No. 589,299. Patented Aug. 31, 1897.

Witnesses:
Chas. D. King
Fred. J. Dole.

Inventor:
F. H. Richards (No Model.)  4 Sheets—Sheet 3.

F. H. RICHARDS.
WEIGHING MACHINE.

No. 589,299. Patented Aug. 31, 1897.

Witnesses:
Chas. D. King.
Fred. J. Dole.

Inventor:
F. H. Richards.

(No Model.)

F. H. RICHARDS.
WEIGHING MACHINE.

No. 589,299.

4 Sheets—Sheet 4.

Patented Aug. 31, 1897.

Witnesses:
Chas. D. King
Fred. J. Dole

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,299, dated August 31, 1897.

Application filed March 26, 1897. Serial No. 629,342. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering granular and similar materials.

One of the objects of the invention is to provide stream-supplying means intended more especially for delivering to the load-receiver of the weighing mechanism substances of a slow-running character, said means embodying a swinging stream-director and a coöperative conveyer, the latter being preferably stopped on the completion of a load and being adapted when in motion for feeding the necessary drip-stream.

Another object of the invention is to furnish a variable-efficiency device, preferably supported by the weighing mechanism, and automatically-operative means for shifting said device at a stage prior to and immediately preceding the completion of a load, so that the resistance of the counterweight of the beam to the descent of the load-receiver will be so modified as to permit the latter to descend promptly to the poising-line before the load is completed, the remainder of the load being supplied before the emptying of the load-receiver.

Another object of the invention is to provide safety interlocking stop devices between the several supply and load-discharge members, whereby the operation of these members in regular order is insured.

Figure 1:
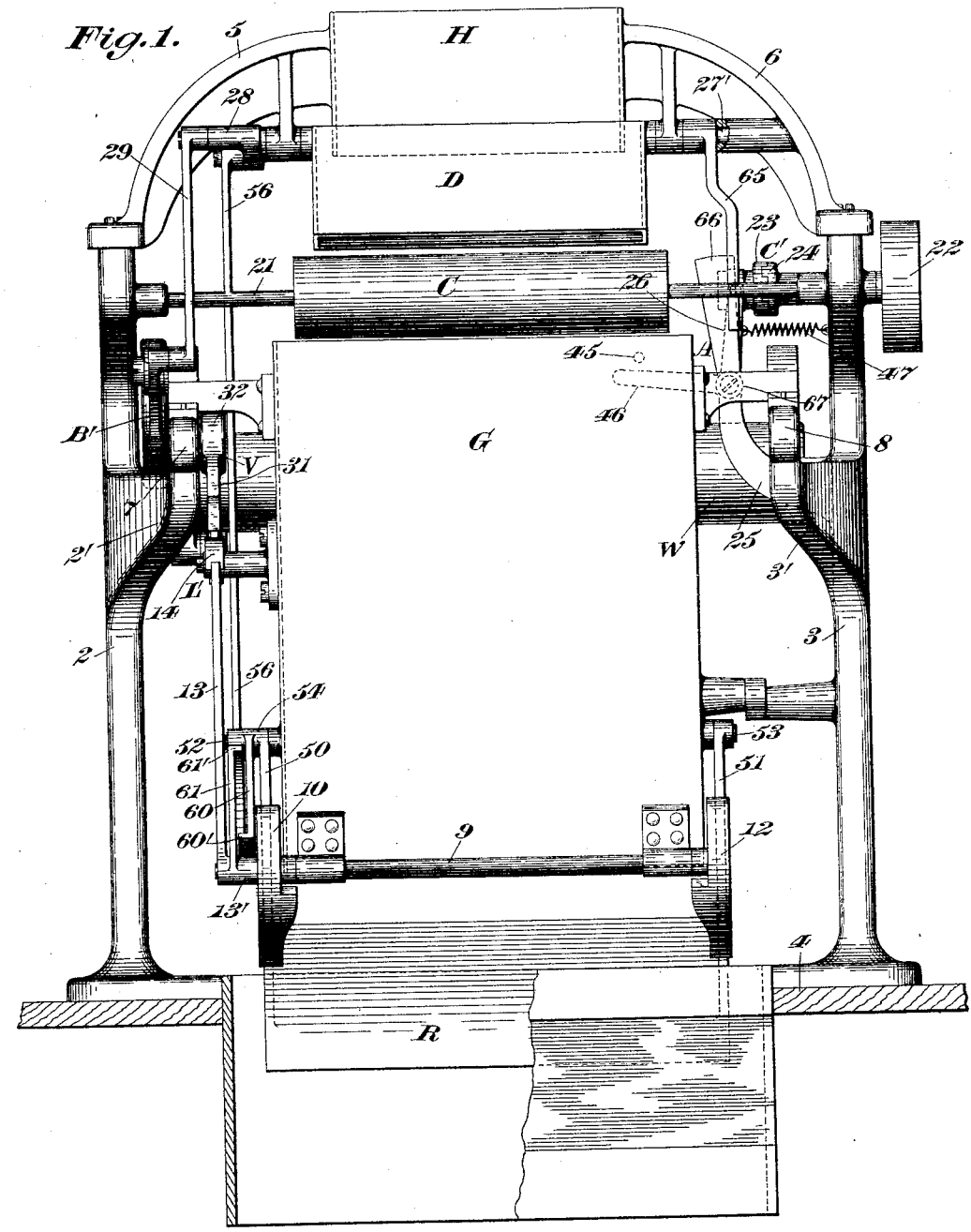
Figure 2:
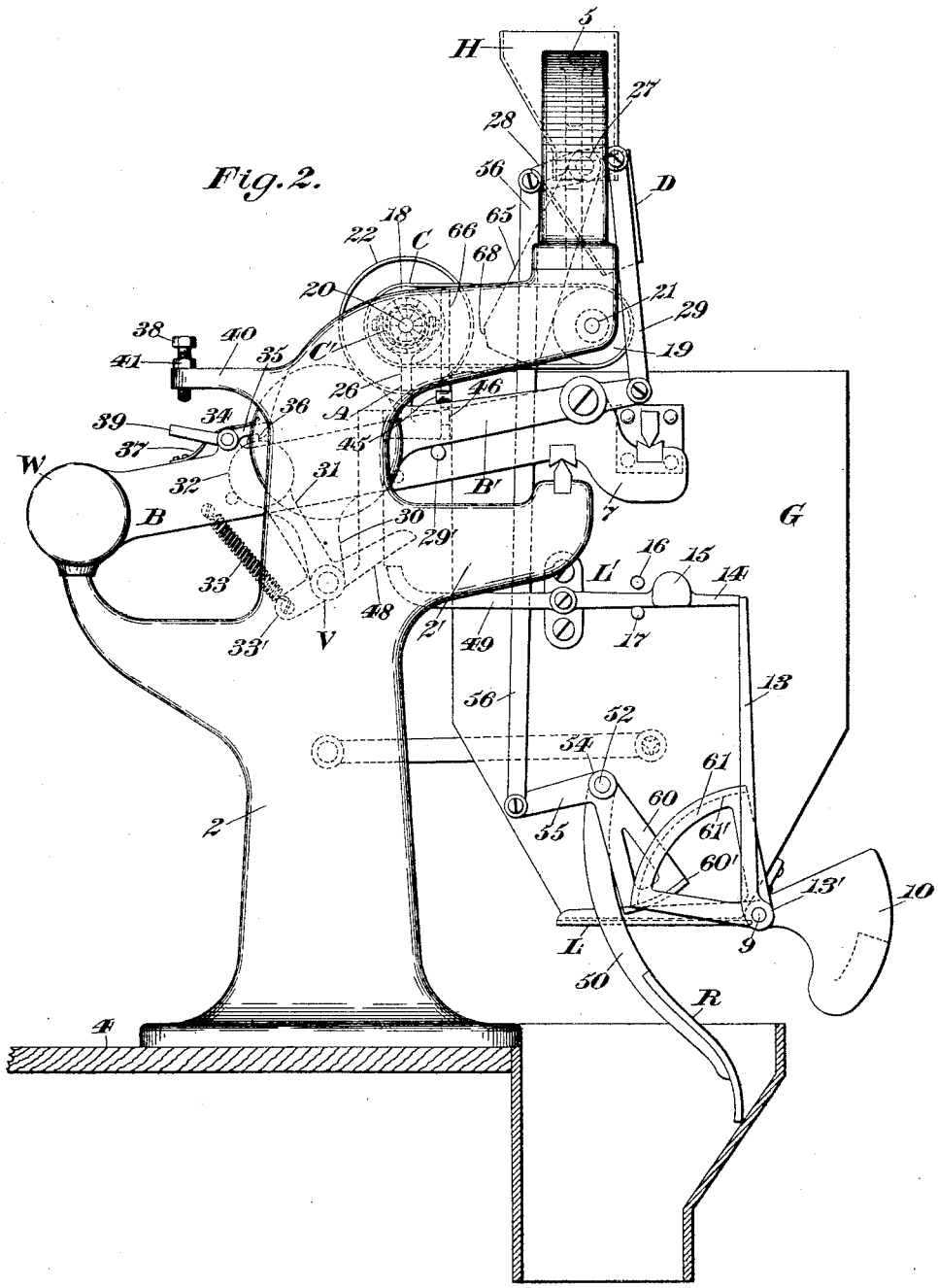
Figure 3:
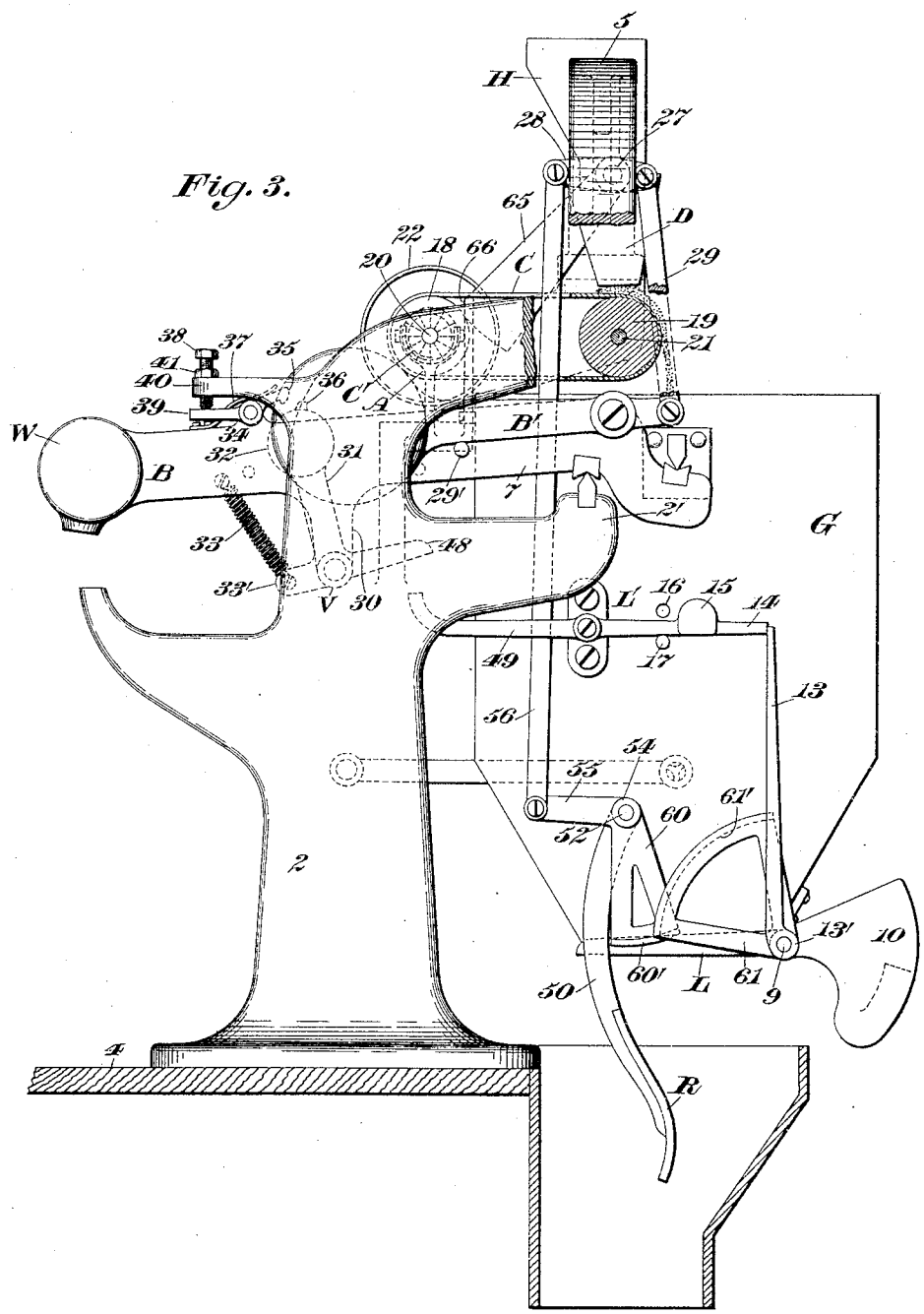
Figure 4:
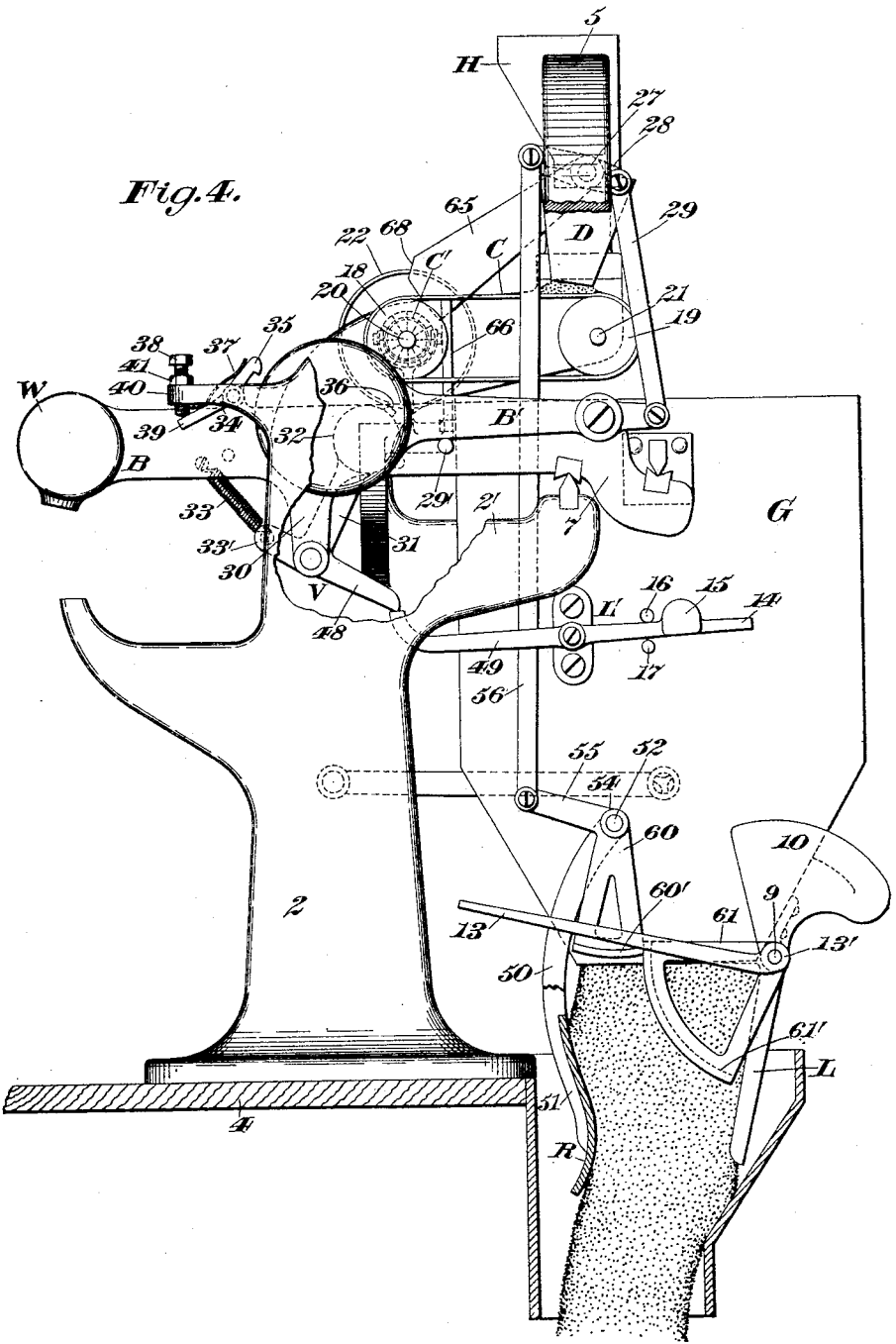

In the drawings accompanying and forming part of this specification, Figure 1 is a front elevation of my improved weighing-machine; and Figs. 2, 3, and 4 are end elevations of the machine as seen from the left in Fig. 1, showing the positions occupied by the respective parts during the making and discharging of a load.

Similar characters designate like parts in all the figures of the drawings.

The framework of the machine may be of any suitable or preferred construction, it consisting in the present case of the end frames or columns 2 and 3, which are mounted upon the floor 4 and which are curved forward near the upper ends, and the brackets 5 and 6, which project oppositely from the supply-hopper H, said brackets being secured to the end frames, as shown.

The weighing mechanism comprises a suitable load-receiver, as G, and a supporting scale-beam therefor, as B, the latter being fulcrumed upon suitable brackets, as 2' and 3', respectively, extending forward from the end frames 2 and 3, the load-receiver being suspended from the poising side of the beam-arms in the usual manner.

The scale-beam B consists of a pair of longitudinal arms 7 and 8, joined at the rear by the cylindrical counterweight W, which latter, when in its normal position, preferably rests upon suitable supports on the framework.

The load-receiver G has the usual discharge-outlet, which is normally covered by a suitable oscillatory closer, as L, pivoted to the load-receiver, said closer consisting of a preferably flat plate, which when shut, as represented in Fig. 2, is contiguous to the lower edge of the load-receiver. The closer is affixed to the rock-shaft 9, carried by the load-receiver, and is provided with the counter-weighted plates 10 and 12 at its opposite ends, (see Fig. 1,) the purpose of said plates being to shut the closer on the discharge of a load.

The means for governing the discharge of a load includes a latch, such as the lever L', which is adapted to engage a member connected with the closer, as the rod 13.

The latch L', as illustrated, consists of a longitudinal lever pivoted intermediately to the load-receiver G, the working arm 14 of said latch being counterweighed, as at 15, whereby it may be thrown into engagement with the arm or rod 13. The action of the latch will be limited by the stops or pins 16 and 17 on the load-receiver, between which the arm 14 is adapted to reciprocate.

The rod or arm 13 is fixed to the tranverse rock-shaft 9 and is disposed at an angle to the latch L' when the closer is shut, whereby the stress applied by the load is taken up by the pivot of the latch and in a lateral direction. When the arm 14 is lifted above the rod 13, the closer L can be forced open.

The supply mechanism for the load-receiver consists, preferably, of a power-driven conveyer and a swinging stream-director, the latter being adapted, when in its outermost shifted position, to deliver a stream of comparatively large size to the load-receiver. As the stream-director is shifted inward or retracted it will coact with the conveyer to reduce the volume of the stream to a size requisite for the drip-stream supplied to the load-receiver to complete the partial load which has been built up by the stream of large volume, said drip-stream being fed or forced to the load-receiver by the conveyer C.

The conveyer, which may be of any suitable type, is represented consisting of an endless belt C, the upper run of which is horizontal, the carrying-rolls of said belt being designated by 18 and 19, respectively, and the shafts 20 and 21 of said rolls being preferably journaled in the end frames 2 and 3. The rear shaft 20 of the conveyer, which in the present case constitutes a power-shaft, is furnished with a suitable driver, such as the pulley 22, which is secured thereto and which in practice will be connected by belting with a suitable motor. (Not shown.)

The driving mechanism for the conveyer C, of which the pulley 22 is a part, includes also a clutch, which may be of any suitable construction, whereby the conveyer may be automatically stopped and started at the proper times, the actuator for said clutch being operated by means controlled by the weighing mechanism, as will hereinafter appear. The clutch is designated by C' and the respective parts by 23 and 24, the clutch member 23 being slidable along the conveyer-shaft 20, whereby when it is in engagement with the clutch member 24 the conveyer will be coupled to the pulley 22, and consequently can be driven for conducting the material to the load-receiver. The actuator for the clutch is designated by A, and it consists of an angle-lever pivoted to the bracket 25, the upper arm 26 of said actuator being bifurcated and having projecting pins seated within a peripheral channel on the clutch member 23, as is customary.

The stream-director is designated by D, it consisting in the present case of a tubular spout supported below the stationary hopper H and having projecting trunnions, as 27 and 27', which are journaled in bearings on the framing. The trunnion 27 has affixed to its outer extremity the rocker 28, to one end of which is pivoted the rod 29, the latter being similarly attached to the auxiliary beam B', which consists of a counterweighted lever pivoted to the arm 7 of the main beam B.

The counterweighted arm of the auxiliary beam B' is adapted, normally, to rest upon the pin 29' on the beam-arm 7, so that as the load-receiver descends the non-counterweighted arm of the auxiliary beam will move in correspondence therewith and will draw the rod 29 downward, and consequently will retract or shift the swinging stream-director inward, so that the supply or stream will be delivered toward the moving conveyer C. On the return of the auxiliary beam B' to its primary position the rod 29 will be thrust upward, and hence the spout D will be swung outward or advanced to again deliver the supply-stream to the load-receiver.

It will be understood that as the spout D is shifted rearward from its outermost position (illustrated in Fig. 2) to the position shown in Fig. 4 it delivers the supply to the moving belt or conveyer C, and that when the spout is over the upper run of the belt the supply will be decreased. When the spout has reached the end of its shifting movement and when the conveyer is stopped, the material will not, of course, be fed to the load-receiver.

In connection with the weighing mechanism I employ a variable-efficiency device, which is supported by one of the members thereof, automatically-operative means controlled by the weighing mechanism being provided to shift said device prior to the discharge of a load, whereby the resistance applied by the beam-counterweight W to the downward movement of the load-receiver will be practically and suddenly decreased, so that the load-receiver can descend promptly to the poising-line.

It will be understood that before the latch which governs the discharge of the load can be operated it is necessary that the load-receiver should contain a mass of material which, added to the weight of the load-receiver, equals in weight the counterpoise. As a part of this load must be included a comparatively small quantity of material which is in the air at a point above the material in the load-receiver. Instead of deferring the descent of the load-receiver until this small quantity of material is received therein I provide the variable-efficiency shifting device hereinbefore mentioned, which when shifted applies its effect to the load-receiver and virtually augments the weight thereof, so that the load-receiver will be caused to descend to the poising-line just preceding the completion of the load, the remainder of the load being delivered before the load-receiver is emptied.

The variable-efficiency device may be of any suitable construction and is preferably carried by the beam for oscillation. Said device is designated by V, and it consists of a counterweighted angle-lever pivoted to the depending arm 30 of the beam-arm 7 for oscillatory movement. The upper or counterweighted arm of the angle-lever V is designated by 31 and the counterweight thereon by 32. It will be evident that as the center of gravity of the weight 32 approaches or nears the center of oscillation of the beam the effect will be substantially to subtract weight from the counterweight W and add weight to the load-receiver G, and this shifting operation, as hereinbefore stated, will take place just preceding the completion of the load.

The shifting means for the variable-efficiency device may be of any suitable character; but it is herein represented consisting of the coiled spring 33, which is connected, respectively, with the beam-arm 7 and to the lug or ear 33', projecting from the angle of the said device.

The variable-efficiency device will be held against action by a suitable detent, such as the spring-actuated latch 34, which is pivoted to the beam-arm 7, the hooked arm 35 of which is adapted to engage the boss or protuberance 36 on the weight 32, a suitable spring, as 37, which is attached to the beam-arm 7 being provided to bear against the hooked arm 35 to hold it normally in engagement with the boss 36.

The tripping device for the latch 34 may be of any suitable kind, it being herein represented as a bolt 38 adjustable toward and from the arm 39 of the latch, said bolt being in threaded engagement with the lug 40 of the end frame 4 and being embraced by the check-nut 41 to hold it in an adjusted position.

It will be observed that the variable-efficiency device V and its latch 34 are situated on the counterpoised side of the scale-beam B, so that when the load is almost completed the free arm 39 of said latch will abut against the fixed tripping device 38, whereby on the slight further ascending movement of said beam the latch will be disengaged from the device V, and the spring 33 will instantly shift the latter, as shown in Fig. 3, to effect the prompt descent of the load-receiver.

As the load-receiver descends by reason of the shifting of the device V the swinging director or spout will be quickly retracted to deliver the supply to the upper run of the conveyer or belt C, which during this last-mentioned action has been stopped by the operation of the clutch C'.

For operating the clutch-actuator A, whereby the movable clutch member 23 can be disengaged from the clutch member 24, I have illustrated the pin 45 extending from the rear wall of the load-receiver and which on the rapid downward movement of the latter is adapted to engage the horizontal arm 46 of the actuator A to move the upright arm 26 of said actuator, so that the two clutch members can be disengaged. For returning the actuator to its normal position the coiled spring 47 is illustrated, it being attached, respectively, to the upright arm of said actuator and to the end frame 3.

The variable-efficiency device V in addition to serving as a means for promptly carrying the load-receiver G down to the poising-line preceding the completion of a load constitutes a tripper for the closer-holding latch L', it being remembered that the said device is represented as an angle-lever.

In Fig. 3 the device V is illustrated having just been released to transfer its effective force to the load-receiver, and when the same has nearly reached the limit of its shifting movement the arm 48 thereof will impart a sudden blow to the latch-arm 49, so that the weighted arm 14 of said latch will be raised above the coöperating arm 13, whereby the closer L will be released and can be forced open by the weight of the material sustained thereon.

In connection with the load-discharge mechanism for the closer L a regulator of suitable construction will be furnished, the same being carried into the path of movement of the discharged stream of material from the load-receiver by suitable instrumentalities. Said regulator is designated by R and is represented consisting of a slightly-curved plate oscillatory in a direction opposite to the closer L, said regulator or plate being of a length exceeding the width of the load-receiver G and being fastened to the rods 50 and 51, respectively, that are pivotally suspended from the load-receiver G, the pivots therefor being designated by 52 and 53. The hub 54 of the rod 50 is furnished with a crank-arm 55, to which is pivoted the longitudinal arm 56, connected at its upper end to the rearwardly-extending arm of the rocker 28 of the swinging stream-director or spout D.

It will be remembered that as the load-receiver G descends during the making of a load the stream-director D is swung inward by reason of its connection with the auxiliary beam B', and it will be apparent that on this action the rod 56 will be raised to swing the regulator R to the left, as indicated in Fig. 4, whereby, when the closer L is opened by the tripping of the latch L', the material can act against said regulator to hold the same and the swinging stream-director D in their shifted positions, even after the closer L has been shut. The material, as usual, is emptied into a discharge-hopper, such as H, situated below the load-receiver.

A pair of reciprocally-effective stops are shown at 60 and 61 operative, respectively, with the regulator R and the closer L, said stops being in position to block the action of each other and having the oppositely-disposed flanges 60' and 61', respectively. The two stops 60 and 61 are in the form of open segments, the first mentioned being fixed to the hub 54 of the regulator-arm 50 and the other to the hub 13' of the arm 13.

In Fig. 2 the spout D is represented in its outermost position and the closer as shut, and the curved flange 61' is shown above and in contact with the curved flange 60', and it will be apparent that should the latch L' be prematurely tripped from any cause the closer L cannot open as the interlocking stop 60 will prevent this action.

As the load-receiver G descends the spout D will be swung inward, and the regulator R will be simultaneously carried in a corresponding direction, the stop 60 moving therewith, and when the load is completed the stop 60 will have been swung across the outside curved face of the flange 61', so that the interlocking stop 60 then releases the stop 61, and when the latch L' is tripped the closer L will be opened, as shown in Fig. 4, whereby the outside face of the curved flange 61' will run in contact with the flange 60' to prevent retractive action of the stop 60 and the regulator R so long as the closer L is open, the spout D being also held in its shifted position. When the closer L shuts, the stop 61 will move therewith, and when said closer reaches its normal position the stop 61 will release the stop 60, but the regulator R will still be held in its shifted position by the pressure of the material against the same. When a certain part of the load has been discharged from the load-receiver, the counterweight W will drop, thereby raising the load-receiver G, but the auxiliary beam B' will be held in its shifted position by reason of its connection with the regulator R, as will be obvious. When the regulator R is released, the auxiliary beam B' will return to its normal position and in so doing will impart an upward thrust to the rod 29 to force the spout D to its outer position (illustrated in Fig. 2) to again deliver the stream into the load-receiver. The motion of the latch L' will be limited by the two stops 16 and 17 on the load-receiver, and it is a very slight one. On the ascent of the load-receiver the free end of the latch L' will bear against the arm 48 of the device V, whereby the latter will be shifted as the load-receiver and the latch rise, it being understood that said latch is held against action by the stop 16, whereby it can operate the device V, which latter when it reaches its normal position is engaged and held by the spring-actuated latch 34.

In connection with the swinging stream-director D, I provide means for holding the clutch-actuator A in its shifted position, the means shown for this purpose consisting of the stop 65 in the form of a blade fixed to and depending from the trunnion 27, said stop or blade 65 being adapted to coöperate with the stop or blade 66, fixed to the hub 67 of the clutch-actuator. The stop or blade 65 has at one corner thereof the oblique stop-face 68, the function of which will now be made apparent. The arm 66, which constitutes a stop, is disposed in the path of movement of the stop 65, and at the commencement of the poising period, as indicated in Fig. 3, the oblique stop-face 68 will abut against the outside face of the stop 66, whereby the further rearward shifting of the spout D will be momentarily arrested to permit the conveyer to force the drip-stream into the load-receiver to complete the load. Just preceding the completion of the load the device V will be shifted to cause the load-receiver to descend promptly, whereby the pin 45 on said load-receiver will impinge against the arm 46 of the actuator A to rock the stop 66 to the left and beyond the path of movement of the stop 65, whereby the spout D can be immediately swung inward to carry the stop 65 therewith, the inside face of the latter being contiguous to the outer edge of the stop 66, as indicated in Fig. 4, whereby the clutch-actuator A will be held in its shifted position as the lightened load-receiver rises. When the spout D is released in the manner hereinbefore specified, it will be swung outward by the dropping of the auxiliary beam B', which returns the stop 65 to its primary position for freeing the coacting stop 66. When the stop 66 is released by the stop 65, it will be returned to its primary position by the coiled spring 47 to couple the clutch members 23 and 24, respectively, it being understood that the two stops 65 and 66 are reciprocally effective.

The operation of the hereinbefore-described machine, briefly stated, is as follows: Fig. 2 represents the positions occupied by the different parts at the commencement of operation, the closer L being shut and held in such position by the latch L', which engages the arm 13, and spout D being illustrated in its outermost position and the conveyer C in motion to deliver a stream of large volume to the load-receiver. When a certain proportion of the load has been received by the latter, it, with the poising side of the beam B, will descend, the auxiliary beam B' moving simultaneously therewith and pulling the rod 29 downward to swing the spout D rearward. At the commencement of the poising period, as shown in Fig. 3, the oblique face 68 of the stop 65 will abut against the coöperating stop 66 to permit a reduced stream to be fed or forced into the load-receiver G by the conveyer C, said load-receiver meanwhile descending and the counterpoised side of the beam rising, so that at a point just before the completion of a load the tailpiece or arm 39 of the latch 34 will be carried against the bolt 38 to trip said latch and thereby release the device V. When the latter is released, it is instantly shifted by the coiled spring 33, so that in effect it transfers its force to the load-receiver G to cause the latter to descend promptly, and during this action the pin 45 will abut against the arm 46 of the clutch-actuator A for uncoupling the clutch members 23 and 24. When the actuator A is thus operated, the stop 66 will cross the path of the stop 65, so that the spout D can instantly be swung inward. When the device V nearly reaches the end of its movement, it will impart a sudden blow to the latch L' to trip the same, and when the latch is tripped the closer L will be forced open to discharge the material against the regulator R, which had previously been shifted. When the mass has passed below the closer, it can return to its normal position, the regulator R being held by the material. When the material passes clear of the regulator, the latter can return to its primary position, and in so doing it releases the spout D and the auxiliary beam B' in the manner hereinbefore specified. When the beam B' is released, it will drop and return the several members to their primary places, succeeding which the operation will be repeated.

Having described my invention, I claim—

1. The combination, with a load-receiver, of a scale-beam therefor; a counterweighted lever pivoted to the scale-beam; means normally operative for holding said lever against action; means for releasing said lever; and means for shifting said lever.

2. The combination, with a scale-beam having a depending arm, of a load-receiver supported by said scale-beam; a counterweighted lever pivoted to said arm; and automatically-operative means for shifting said lever relatively to the scale-beam prior to the discharge of a load.

3. The combination, with a load-receiver, of a scale-beam therefor; a variable-efficiency device supported by the scale-beam; a latch normally adapted to hold said device against action; and means for tripping said latch.

4. The combination of a load-receiver; a supporting scale-beam therefor; a counterweighted lever supported on the scale-beam; a spring for shifting said lever; and a detent normally operative to hold the lever against action by the spring.

5. The combination, with a load-receiver and a supporting scale-beam therefor, of a variable-efficiency device carried by the scale-beam; a spring attached, respectively, to the scale-beam and said device; a latch for engaging said device; and a latch-tripping device.

6. The combination, with a load-receiver and a supporting scale-beam therefor, of a counterweighted lever pivoted to the load-receiver; a spring attached, respectively, to the beam and said lever; a latch adapted to engage the lever; and a tripper for said latch, on the framework.

7. The combination, with a load-receiver, of a supporting scale-beam therefor; a counterweighted device mounted on the scale-beam for shifting movement; a latch adapted normally to engage said counterweighted device; and an adjustable tripper for said latch.

8. The combination, with a load-receiver; of means including a latch, for governing the discharge of the load thereof; and a variable-efficiency device carried by the weighing mechanism and constituting a tripper for said latch.

9. The combination, with a load-receiver having a discharge-outlet; of a closer for said outlet, connected with the load-receiver; means including a latch, for holding said closer against movement; and a variable-efficiency device carried by the weighing mechanism and constituting a tripper for said latch.

10. The combination, with a load-receiver; of means including a latch, for governing the discharge of a load; and a counterweighted angle-lever carried by the weighing mechanism, one arm of which is adapted to engage said latch to trip the same.

11. The combination, with a load-receiver, of a closer therefor; an arm connected with said closer; a counterweighted latch pivoted to the load-receiver and adapted to engage said arm; a scale-beam for supporting the load-receiver; a counterweighted angle-lever pivoted to the scale-beam, one arm of which is adapted to engage the latch; a spring connected, respectively, with the scale-beam and said angle-lever; a spring-actuated latch adapted normally to hold said angle-lever against action; and an adjustable tripper for said spring-actuated latch, said tripper being carried by the framework.

12. The combination, with a load-receiver having a closer connected therewith for oscillation, of a regulator supported for oscillatory movement in a direction opposite to that of the closer; and means for shifting said regulator, whereby it will be carried into the path of the stream discharged from the load-receiver.

13. The combination, with a load-receiver having a discharge-outlet, of a closer for said outlet; a regulator mounted on the load-receiver and oscillatory in a direction opposite to that of the closer; and means for shifting said regulator to carry it into the path of the discharging stream from the load-receiver.

14. The combination, with a load-receiver having a discharge-outlet, of a closer connected with said load-receiver; a regulator mounted on the load-receiver and oscillatory in a direction opposite to that of the closer; means for shifting said regulator to carry it into the path of the discharging stream from the load-receiver; a stop connected with the regulator; and a coöperating stop connected with the closer, each of said stops being adapted to block the action of the other.

15. The combination, with a load-receiver having a closer, of a regulator oscillatory in a direction opposite to that of the closer; means for shifting said regulator to carry it into the path of the discharging stream from the load-receiver; a stop connected with said regulator; and a coöperating stop connected with the closer, each of said stops being adapted to block the action of the other.

16. The combination, with weighing mechanism including a load-receiver, of a conveyer; driving mechanism for said conveyer, including a clutch; a clutch-actuator; and a swinging stream-director having means for holding the clutch-actuator in its shifted positon.

17. The combination, with weighing mechanism including a load-receiver, of a conveyer; driving mechanism for said conveyer, including a clutch; a clutch-actuator; a swinging spout coöperative with the conveyer; and means operative with said swinging spout, for holding the clutch-actuator in a shifted position.

18. The combination, with a load-receiver having a closer, of a regulator mounted on the load-receiver; a conveyer; a swinging stream-director coöperative with said conveyer; connections between the stream-director and the weighing mechanism; and a rod connecting said regulator and stream-director, respectively.

19. The combination, with weighing mechanism including a load-receiver, of a conveyer; driving mechanism for said conveyer, embodying a clutch; a clutch-actuator; a swinging stream-director; and stops connected, respectively, with the stream-director and the clutch-actuator, each of said stops being adapted to block the action of the other.

20. The combination, with weighing mechanism including a load-receiver, of an endless belt constituting a conveyer; a swinging stream-director coöperative with said belt; and means connected with the stream-director, for holding said belt out of action.

21. The combination, with weighing mechanism embodying a load-receiver, of a closer for said load-receiver; a regulator; stops connected, respectively, with the regulator and the closer, each for blocking the action of the other; a conveyer; and a swinging stream-director coöperative with the conveyer and connected with said regulator.

FRANCIS H. RICHARDS.

Witnesses:
F. N. CHASE,
ANDREW FERGUSON.